Jan. 4, 1938.  D. G. ADAMS  2,104,146
LUBRICATING APPARATUS
Original Filed Dec. 31, 1928
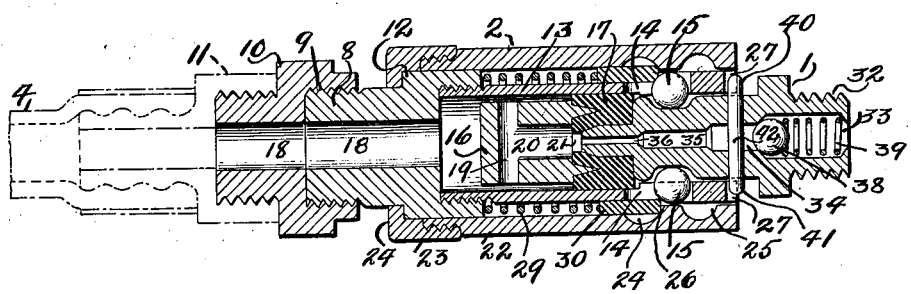
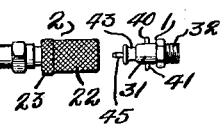
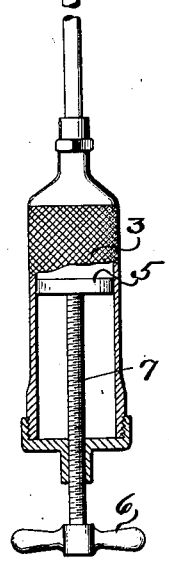
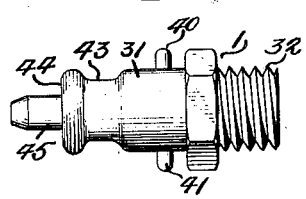
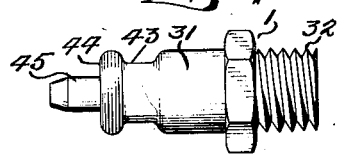
INVENTOR
Daniel G. Adams.
BY Liddle, Marquson and Hornidge
ATTORNEYS.

Patented Jan. 4, 1938

2,104,146

UNITED STATES PATENT OFFICE 2,104,146

LUBRICATING APPARATUS

Daniel G. Adams, New York, N. Y., assignor to Adams Grease Gun Corporation, New York, N. Y., a corporation of New York Original application December 31, 1928, Serial No. 329,361. Divided and this application July 13, 1932, Serial No. 622,203

4 Claims. (Cl. 184—105)

This invention relates to an improved apparatus to be used in connection with the supplying of grease at high pressure to parts to be lubricated, and has for one of its objects the provision of a fitting or grease cup to be attached to the part to be lubricated together with a pump or grease gun and a coupler for detachably connecting the grease gun or pump to the cup.

More specifically the present invention relates to a coupler of the ball type wherein balls are employed as the means for connecting the coupler and gun or pump to the fitting or cup when the apparatus is in use.

A still further object of the invention is the provision of an apparatus in which the coupler and the pump or grease gun are non-rotatable with respect to each other irrespective of whether or not an intermediate conduit is employed together with means whereby rotation of the coupler on the grease cup or fitting is prevented. This enables the apparatus to be employed in situations where it is inconvenient or impossible to use a device in which the coupler and the grease gun are adapted for relative rotation.

A still further object of the invention is the provision of a fitting or cup of such construction that a double seal is provided against the leakage of grease along the outside of the cup.

In the accompanying drawing wherein an embodiment of the invention has been illustrated:

Fig. 1 is an elevational view of my improved fitting, coupler and attached grease gun;

Fig. 2 is a sectional view of the coupler and fitting;

Fig. 3 is an elevational view of the fitting; and

Fig. 4 is an elevational view of a modified form of fitting.

Referring to the drawing in detail, 1 designates a grease cup or fitting which is adapted to be screwed into the part to be lubricated.

2 designates a coupler adapted to be applied to the fitting or grease cup 1 and 3 designates a grease gun by which grease is to be supplied under pressure. Intermediate the coupler 2 and grease gun 3 and connecting the two is a conduit 4. The coupler 2, conduit 4 and the grease gun 3 are non-rotatable with respect to each other.

The grease gun is of the type employing a cylinder and a piston 5 within the cylinder adapted to force grease under pressure out of the gun and into the cup or fitting 1. The piston is moved along the cylinder by threaded rod 7 attached to the piston and rotated by handle 6 on the projecting end of the rod.

It will be appreciated of course that if desired the coupler 2 can be applied directly to the discharge end of the gun 3 thereby dispensing with the conduit 4.

The coupler 2 comprises a base 8 threaded at 9 to receive a nipple 10. This nipple is threaded externally at its rear end for receiving a member 11 which is forced into the conduit 4.

The base 8 is enlarged as shown at 12 and this enlarged portion is provided with a short threaded bore of relatively large diameter which receives a threaded sleeve 13.

The sleeve 13 is provided adjacent its forward or outer end with a series of slots 14 adapted to retain locking means in the form of balls 15. These balls 15 are of such size with relation to the slots 14 in the sleeve as to project inwardly of the sleeve for some distance as will be seen from an inspection of Fig. 2 of the drawing.

The sleeve 13 is provided internally with a floating piston 16 provided on its forward end with a gasket 17 of suitable material such as leather or fiber. This gasket is forced over the end of the piston so as to be expanded into grease proof contact with the walls of the sleeve 13.

The member 10 and base member 8 are bored longitudinally as shown at 18, in line with the conduit 4.

The floating piston 16 is of smaller diameter than the interior of the sleeve 13 and is provided with a transverse bore 19 and a communicating longitudinal bore 20, the latter being in line with a bore 21 in the gasket 17. It will be seen, therefore, that grease can be forced by the piston 5 through the conduit 4, members 10 and 8 and into the rear end of the sleeve 13, and from thence along the sides of the floating piston 16, the transverse conduit or channel 19, longitudinal bore and the bore 21 of the gasket into the fitting or grease cup 1 as will be described later on.

Mounted on the enlarged portion 12 of the base member 8 is a slidable casing or sleeve 22, this sleeve at its rear end being provided with a member 23 screwed thereon and provided with an inwardly projection portion 24 adapted to cooperate with the shoulder of the member 8 provided by the enlargement of this member at 12 so as to limit the forward movement of the casing or sleeve.

The casing or sleeve 22 is provided internally with circumferential grooves 24 and 25 slightly spaced from each other by a portion 26 of the sleeve, as will be seen from Fig. 2. The outer end of the sleeve 13 is provided with radial slots 27 diametrically opposite each other.

Intermediate the sleeve 13 and casing 22 is a coil spring 29, the rear end of which abuts the enlarged portion 12 of the base member 8, the forward end abutting a ring 30 which is carried by the sleeve 13, this spring 29 maintaining the ring 30 in engagement at all times with the locking balls 15 and always urging these balls toward locking position.

The fitting or grease cup 1 which is adapted for cooperation with the coupler above described comprises a cylindrical member 31 threaded at its rear end as shown at 33 for attachment of the cup to a part to be lubricated, and is provided also at its rear with a longitudinal bore 33. In line with this bore are bores designated 34, 35 and 36 of gradually decreasing diameters.

In the bore 34 is a ball valve 38 the seat of which is provided by the junction of the bores 33 and 34. Spring 39 holds the valve to its seat. The valve is unseated by being moved rearwardly of the fitting or grease cup 1 against the action of the spring 39 by the pressure of the grease as it is forced into the fitting.

The body of the fitting or grease cup 1 is provided with projections 40 and 41 diametrically opposite each other. These projections may be, as illustrated, the ends of a pin 42 which passes transversely through the fitting, the ends of this pin projecting beyond the periphery of the fitting.

Forward of these projections the fitting or cup is provided with a circumferential locking groove 43 adapted to receive the locking balls 15 of the coupler.

The forward end of the fitting is reduced in diameter to provide a flat faced shoulder 44 and a tit or nipple 45.

When the improved apparatus is put to use the coupler 2 is applied thereto simply by pushing the same over the end of the fitting or cup 1, the balls 15 at that time, so far as their position in the coupler is concerned, being as shown in Fig. 2. The engagement of the balls 15 with the ring 30 and the pressure exerted in applying the coupler will move the ring 30 rearwardly of the coupler against the action of the spring 29 until the coupler is advanced sufficiently to bring the groove 24 of the coupler sleeve 22 in line with the locking balls. The balls are now free to move outwardly radially of the coupler into this groove so as to permit the coupler to be moved upon the fitting until stopped by the engagement of the slots 27 with the projections 40 and 41 on the fitting or grease cup.

The spring 29 is at this time under compression and release of the pressure on the coupler will permit the spring to force the sleeve 22 outwardly in a direction away from the fitting or cup, to the position shown in Fig. 2. It will be seen from this figure that the locking balls are in the locking groove 43 while the sleeve 22 has been moved outwardly until the portion or ridge 26 of the sleeve between the sleeve grooves 24 immediately surrounds the balls 15 preventing their outward movement and hence holding the coupler locked to the fitting or cup, and rotation of the coupler on the fitting or cup is prevented by the engagement of the slots 27 with the fitting projections 40 and 41.

When pressure is applied to the grease in the gun 3 to force the grease through the coupler and fitting to the bearing or other parts to be lubricated the floating piston 16 is forced toward the fitting and the gasket 17 forced over the nipple 45 to bring the forward end or face of the bushing against the shoulder 44 of the fitting. This provides, therefore, a double seal against the leakage of any grease along the outside of the fitting or grease cup 1 and the higher the pressure on the grease the more intimate the contact of the gasket 17 with the nipple 45 and the shoulder 44, and the more pronounced the double seal.

Inasmuch as the gun 3, conduit 4 and the coupler are non-rotatable with respect to each other and inasmuch as rotation of the coupler on the fitting or grease cup 1 is prevented by the slots 27 engaging the projections 40 and 41 on the fitting or grease cup, the apparatus can be operated, that is, the rod 7 rotated to produce pressure on the grease, by one hand. This is very convenient when working around automobiles, for example, where the cup or fitting 1 may be almost inaccessible.

The embodiment of the invention as illustrated in Fig. 4 is the same as just described except that the projections 40 and 41 have been left off. The double sealing feature, however, provided by the tit 45 and shoulder 44 has been retained.

It will be appreciated from the foregoing that while the grease cup or fitting above described has the advantages above referred to, it is also of advantage in enabling the fitting to be used with a grease gun of the push type, for example, which instead of being equipped with a coupler, such as the coupler 2, is merely pushed over the nipple 45 at the end of the fitting or grease cup.

This application is a division of my copending application Serial No. 329,361, filed December 31, 1928.

What I claim is:—

1. A grease cup for use in connection with a coupler for detachably connecting a grease gun to the cup, said cup comprising in combination a tubular member adapted to have its rear end attached to a part to be lubricated, the forward portion of the tubular member being provided with a sealing tit of smaller diameter than the main portion of the tubular member for sealing entry into a coupler and with a sealing shoulder for sealing engagement with the end of the coupler, said main portion of the tubular member being provided with a circumferential locking groove for cooperation with the coupler to draw the said tit and sealing shoulder into said sealing positions with respect to the coupler.

2. A grease cup for use in connection with a coupler for detachably connecting a grease gun to the cup, said cup comprising in combination a tubular member adapted to have its rear end attached to a part to be lubricated, the forward end of the tubular member being provided with a reduced portion adapted to cooperate with a coupling member to provide a sealing tit for sealing entry into the coupler and a sealing shoulder for sealing engagement with the end of the coupler, and a circumferential locking groove and projections on the periphery of the main portion of the tubular member to the rear of said sealing tit and sealing shoulder for locking a coupler to the cup and to prevent its rotation on the cup.

3. A grease cup for use in connection with a coupler for detachably connecting a grease gun to the cup, said cup comprising in combination a tubular member adapted to have its rear end attached to a part to be lubricated, the forward portion of the tubular member being reduced in diameter to provide a sealing tit and a sealing shoulder immediately to the rear of it, to provide a plug seal and face seal with a compressible portion of the coupler, the cup to the rear of the sealing shoulder being provided with a locking groove for cooperation with the coupler to draw the cup into said sealing engagement with the coupler.

4. A grease cup for use in connection with a coupler for detachably connecting a grease gun to the cup, said cup comprising in combination a tubular member threaded at its rear end to adapt it for attachment to a part to be lubricated, said member being bored longitudinally to provide aligned bores of different diameters, the connection between the two rearmost bores providing a valve seat, a ball valve in one of said last mentioned bores and opening outwardly of the cup, a spring for holding said valve to its seat, the forward end of said tubular member being reduced in diameter to provide a sealing tit concentric with the tubular member for sealing entry into the compressible portion of the coupler and a sealing shoulder to the immediate rear of said tit, for sealing engagement with the end of the compressible portion of the coupler and a locking groove in the periphery of the tubular member back of said sealing shoulder to hold said tit and said sealing shoulder in the said sealing positions with respect to the coupler.

DANIEL G. ADAMS.